United States Patent [19]
Avery, Jr. et al.

[11] 4,230,426
[45] Oct. 28, 1980

[54] METHOD FOR TREATING CONDUIT TO IMPROVE FLOW CHARACTERISTIC AND RESULTING CONDUIT PRODUCT

[75] Inventors: Hugh E. Avery, Jr., Houston; Jerome I. Paulson, Spring, both of Tex.

[73] Assignee: Allied Industries, Inc., Houston, Tex.

[21] Appl. No.: 22,095

[22] Filed: Mar. 20, 1979

[51] Int. Cl.³ .......................................... B65G 53/00
[52] U.S. Cl. .................................. 406/191; 72/53; 138/155
[58] Field of Search ............... 406/191, 92; 138/155; 15/104.06 R, 104.08; 72/53; 51/410

[56] References Cited
U.S. PATENT DOCUMENTS

| | | | |
|---|---|---|---|
| 3,224,814 | 12/1965 | Fisher | 406/191 |
| 3,485,073 | 12/1969 | Burney | 72/53 |
| 3,824,827 | 7/1974 | Stockbridge et al. | 406/191 X |
| 4,064,293 | 12/1977 | Nicklas | 15/104.06 R X |

*Primary Examiner*—Robert B. Reeves
*Assistant Examiner*—Gene A. Church
*Attorney, Agent, or Firm*—Kenway & Jenney

[57] ABSTRACT

A method of reducing the formation of fines and streamers in connection with the gas conveying of plastic particles (and the resulting conveying apparatus), characterized by the maintenance of particular acute angle relationships between the longitudinal flow direction of particles and the impact direction of shot-peening previously used to condition pipe section interior wall means.

6 Claims, 2 Drawing Figures

METHOD FOR TREATING CONDUIT TO IMPROVE FLOW CHARACTERISTIC AND RESULTING CONDUIT PRODUCT

BACKGROUND AND SUMMARY OF INVENTION

It has long been recognized that, in connection with the pneumatic or gas conveying of plastic particles, i.e. polyethylene, polypropelene, etc., that conduit interior wall treatment is desirable for the purpose of minimizing the formation of fines and streamers during the particle conveying operation.

Representative of prior art efforts in this connection are the following United States Patents:

| U.S. Pat. No. | Patentee | Issue Date |
| --- | --- | --- |
| 2,784,038 | G. Schneider | March 5, 1957 |
| 2,834,059 | H. H. Hoelzel | May 13, 1958 |
| 3,117,821 | L. E. Mylting | January 14, 1965 |
| 3,380,783 | J. C. Hunter | April 30, 1968 |
| 3,464,740 | S. R. Scruby et al | September 2, 1969 |
| 3,719,207 | H. Takeda | March 6, 1973 |
| 3,912,474 | W. H. H. Drews | October 14, 1975 |

It has also been recognized, heretofore, that stainless steel conduits may be shot-peened, utilizing a Hodge Clemco Ltd. "Holloblast" nozzle for the purpose of producing a roughened surface, having a "dappled" finish, for the purpose of minimizing the formation of "smears" when particle nibs come into contact with the conduit wall during the conveying operation.

However, so far as is presently known, it has not heretofore been disclosed in the prior art that fines and streamers can be minimized and/or prevented to a substantial degree, or to a significantly improved extent, by maintaining a particular relationship between the longitudinal flow direction of particles through shot-peened conduit means and the original impact angle of the shot employed during the fabrication of such shot-peened conduit means.

Specifically, this invention contemplates methods as subsequently described, along with conduit apparatus resulting from the implementation of such methods.

The basic method aspect of the invention is characterized as follows.

This basic method for reducing the formation of fines and streamers in the gas conveying of plastic particles, is applicable where the interior of a plurality of particle conveying conduit sections are treated by shot-peening the interior wall means of each of these sections, with shot being impacted against the wall means of each of the sections at an acute, impacting angle, the apex of which points generally longitudinally of each said section toward one end thereof.

The improvement afforded by the method resides in the steps of:

assembling the plurality of shot-peened, particle conveying conduit sections to define conduit means wherein the apexes of the acute, impacting angles all point generally in an intended longitudinal flow direction of the plastic particles; and flowing the plastic particles through said assembly of shot-peened particle conveying conduit sections in the intended flow direction with the generally longitudinal flow direction of the particles through each section forming, at the shot-peened interior wall means thereof, an acute, particle flow to shot impact direction related angle, with respect to the directions of impacting of the shot, with these angles being oriented in each of the sections with the angle apex thereof generally pointing toward the afore-said one end thereof.

Further aspects of the invention reside in the arrangement wherein the acute, particle flow to shot impact related angle comprises about 30 to 45 angular degrees and resides in the arrangement wherein the particle conveying conduit sections are fabricated of aluminum and the shot which was used in shot-peening comprises chilled steel shot.

Having described the general background and nature of the invention, it is now appropriate to give consideration to a preferred format for practicing the invention. This format will be described with reference to exemplary drawings which accompany this application.

DRAWINGS

In the drawings:

FIG. 1 provides a schematic, sectional, elevational view of a conduit section being shot-peened for installation in an optimized flow system of the present invention; and FIG. 2 schematically illustrates, in a somewhat reduced scale and in a partially sectional, elevational format, the manner in which shot-peened pipes, prepared as shown in FIG. 1, are particularly oriented and arranged so as to provide the advantages of the present invention, entailing the minimization of the formation of fines and streamers in connection with the air-conveying of plastic particles.

DETAILED DESCRIPTION

In describing the presently preferred embodiment of the invention, reference will be made to each of FIGS. 1 and 2.

Figure 1:
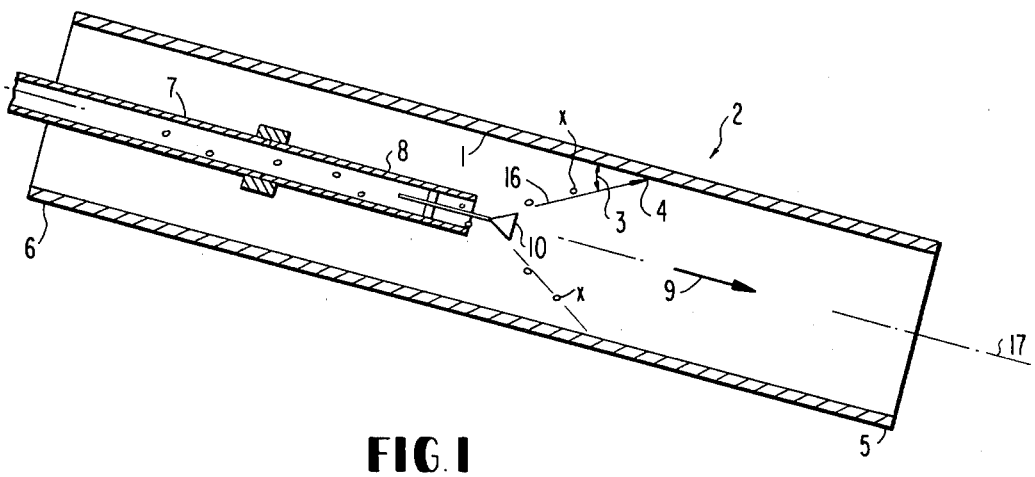

FIG. 1 generally depicts the manner in which conduit sections may be shot-peened, with the shot being impacted against the interior wall means of the conduit section so as to yield an acute impact angle between the shot impact direction and the longitudinal direction of the pipe.

Figure 2:
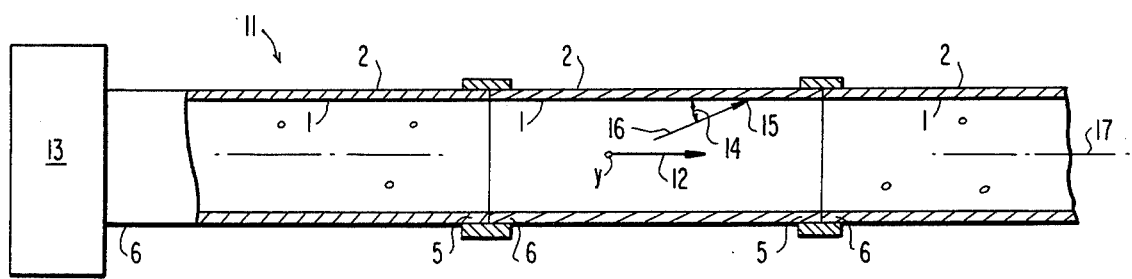

As depicted in FIG. 2, the interior 1 of each of a plurality of particle conveying conduit sections 2 are treated by shot-peening the interior wall means 1 of each of these sections. The shot x is impacted against the wall means 1 of each of the sections 2 at an acute, impacting angle 3, the apex 4 of which points generally longitudinally of each said section 2 toward one end 5 thereof. As shown, each section 2 is downwardly inclined from end 6 toward end 5 to facilitate the removal by gravity of shot, as shot peening proceeds.

It is presently believed that, by way of example, but not by way of limitation, that shot-peened pipe may be prepared by employing the Clemco "Hollo-Blast" nozzle such as the model HB-1 available from Clemco Industries, 2177 Jerrold Avenue, San Francisco, California 94124.

When the Clemco "Hollo-Blast" nozzle is employed, it is contemplated that a conduit or lance 7 supporting the nozzle 8 will be advanced through a conduit section, as described in connection with FIG. 1, with shot-peening taking place during the advancing operation. Repeated advancing passes (3 or 4 for example) of the shot-peening lance may be effected in the forward direction 9 shown in FIG. 1 through each conduit section to obtain the desired surface effect. During said shot-peening, shot will be deflected by a cone-like deflector 10, over a 360° pattern, forwardly toward end 5 so as to form the acute shot impact angle 3, as described.

Alternatively, shot-peening nozzles of the type which generate a narrow forwardly inclined but narrow band of shot (as opposed to the 360 degree forward radiating pattern provided by the Clemco nozzle) may be employed, with rotation of the conduit 2 being effected in conjunction with the lance advancing operation in order to achieve surface conditioning over the entire conduit interior.

As earlier noted, the inprovement of this invention, depicted in FIG. 2, resides in the assembly of a plurality of the shot-peened, particle conveying conduit sections 2 to define conduit means 11 wherein the apexes 4 of the acute, impacting angles 3 all point generally in an intended longitudinal flow direction of 12 plastic particles, as supplied by pneumatic conveyor supply means 13.

These plastic particles are flowed through the assembly 11 of shot-peened particle conveying conduit sections 2 in the intended flow direction 12, from end 6 to end 5 of each section.

The generally longitudinal flow direction 12 of the plastic particles y, through each section 2, forms at the shot-peened interior wall means 1 thereof, an acute, particle flow to shot impact direction related angle 14, with respect to the directions 16 of impacting of said shot. These angles 14 (i.e. angles for substantially all particle movement and shot, impact direction relations in any longitudinal plane of any section are oriented in each of the sections 2 with the angle apex 15 thereof generally pointing toward conduit section end 5.

In general, the angles 3 and 14 may be considered, for all practical purposes, to lie in planes coincident with each conduit axial center line 17, which generally parallels the particle, longitudinal flow direction 12. In this connection, it will be appreciated that while plastic particles will not each always move in the true direction 12, their direction of longitudinal advance will be the direction 12.

Significant advantages of the invention, entailing a marked reduction in the formation of fines and streamers, have been achieved utilizing commercial quality, S-660 chilled steel shot, with the chilled steel shot being on the order of 1.6 millimeters in diameter. Air pressure on the order of 100 psig has been employed to propel the shot through the lance 7 and the Clemco nozzle 8 above noted, with a shot feed rate of about 85 lbs. per minute being employed. The advancing rate of the nozzle and supporting lance (through which shot is conveyed) will vary, depending upon conduit size. For example, it is contemplated that a lance supporting the Clemco nozzle, as above noted, may be advanced at the rate of about 8 feet per minute through 3 inch diameter pipe, with the lance being advanced at a rate of about 2 feet per minute during 12 inch diameter pipe.

The advantages attributable to the invention are noticeable in the particular respect that the reduction in fines is markedly increased when the angular relationships of the present invention are maintained, as opposed to flowing particles through shot-peened conduits in the opposite direction, with respect to the apparatus described in connection with the drawings.

When a system is employed utilizing "pipe bends", it is contemplated that such "pipe bends" may be formed from shot-peened straight pipes, with the angular relationship heretofore described being generally maintained with respect to the curved longitudinal flow direction of such a "bend".

It is believed that aluminum conduit benefits in particular from the implementation of the invention and that particularly desirable results (i.e. fines minimization) arise where the acute angle 14 is on the order of about 30 to 45 angular degrees.

SUMMARY OF ADVANTAGES, UNOBVIOUSNESS AND SCOPE OF INVENTION

The principal advantage of the invention, attributable to the maintenance of the unique angular relationships between flow direction and shot-peened impact angle of the present invention as noted, is believed to result in improved and reduced rates of fines and streamer formations, with respect to known prior art and with respect to the use of shot-peened pipe oriented in the reverse of the arrangement herein described.

Significantly, the prior art exemplified by the patents noted above is in no way suggestive of this concept and, even though shot-peening of stainless steel pipe is known to have been heretofore effected, it is not known that such prior art shot-peening contemplated the unique angular relationships of the present invention, with its attendant advantages.

Unobviousness of the invention, in this connection, is further evidenced by the fact that the visual appearance of shot-peened pipe, prepared as hereinbefore described, would not, in and of itself, suggest the directional criticality of the present invention.

Having described a preferred embodiment of the invention, those skilled in the art and familiar with this disclosure will recognize that additions, deletions, substitutions, modifications, and other variations with respect to the disclosed and preferred embodiment may be practiced within the ambit of the invention as set forth in the appended claims.

What is claimed is:

1. In a method of reducing the formation of fines and streamers in the gas conveying of plastic particles wherein the interior of a plurality of particle conveying conduit sections are treated by shot-peeing the interior wall means of each of said sections, with shot being impacted against said wall means of each of said section at an acute, impacting angle, the apex of which points generally longitudinally of each said section toward one end thereof;

the improvement comprising:

assembling said plurality of shot-peened, particle conveying conduit sections to define conduit means wherein the apexes of said acute, impacting angles all point generally in an intended longitudinal flow direction of said plastic particles;

flowing said plastic particles through said assembly of shot-peened particle conveying conduit sections in said intended flow direction with the generally longitudinal flow direction of said particles through each said section forming, at the shot-peened interior wall means thereof, an acute, particle flow to shot impact directions related angle, with respect to the directions of impacting of said shot, with these angles being oriented in each of said sections with the angle apex thereof generally pointing toward said one end thereof; and maintaining said orientation of said particle flow to shot impact related angles through said conduit means, thereby reducing the level of fines which would be generated by a reversal of said flow direction of said plastic particles.

2. A method as described in claim 1 wherein: said acute, particle flow to shot impact related angle comprises about 30 to 45 angular degrees.

3. A method as described in claim 2 wherein:
said particle conveying conduit sections are fabricated of aluminum; and
said shot comprises chilled steel shot.

4. In an apparatus for reducing the formation of fines and streamers in the gas conveying of plastic particles wherein
the interior of a plurality of particle conveying conduit sections are treated by shot-peeing the interior wall means of each of said sections, with shot being impacted against said wall means of each of said section at an acute, impacting angle, the apex of which points generally longitudinally of each said section toward one thereof;
the improvement comprising:
an assembly of said plurality of shot-peened, particle conveying conduit sections defining conduit means wherein the apexes of said acute, impacting angles all point generally in an intended longitudinal flow direction of said plastic particles;
means for flowing said plastic particles through said assembly of shot-peened particle conveying conduit sections in said intended flow direction with
the generally longitudinal flow direction of said particles through each said section forming, at the shot-peended interior wall means thereof, and acute, particle flow to shot impact direction related angle, with respect to the directions of impacting of said shot, with these angles being oriented in each of said sections with the angle apex thereof generally pointing toward said one end thereof; and
said orientation of said particle flow to shot impact direction related angles being maintained throughout said conduit means and being operable to reduce the level of fines which would be generated by a reversal of said flow direction of said plastic particles.

5. Apparatus as described in claim 4 wherein:
said acute, particle flow to shot impact related angle comprises about 30 to 45 angular degrees.

6. Apparatus as described in claim 5 wherein:
said particle conveying conduit sections are fabricated of aluminum; and
said shot comprises chilled steel shot.

* * * * *